The present invention relates to apparatus for exerting pressure on patches applied by means of cement onto the inner wall of a tire.

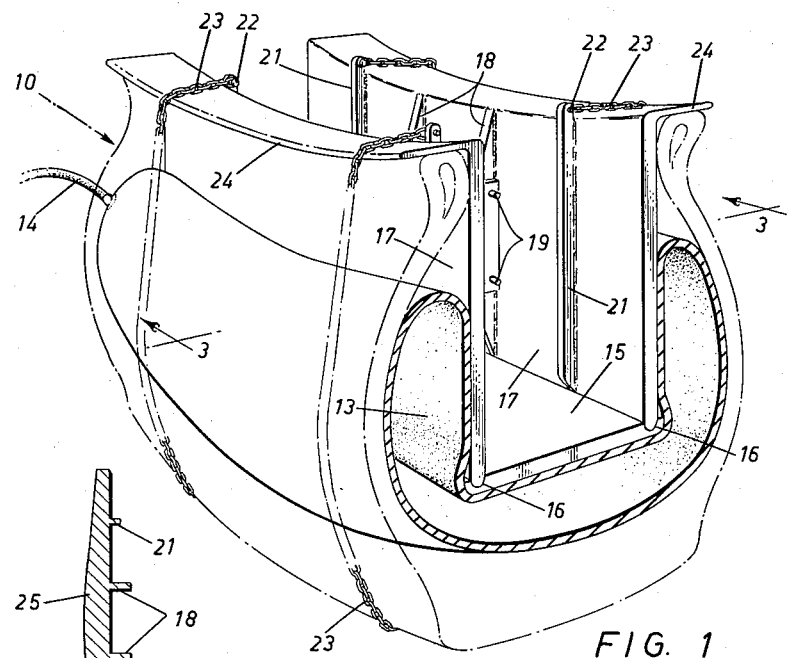
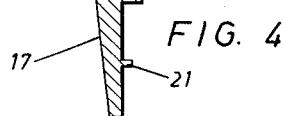
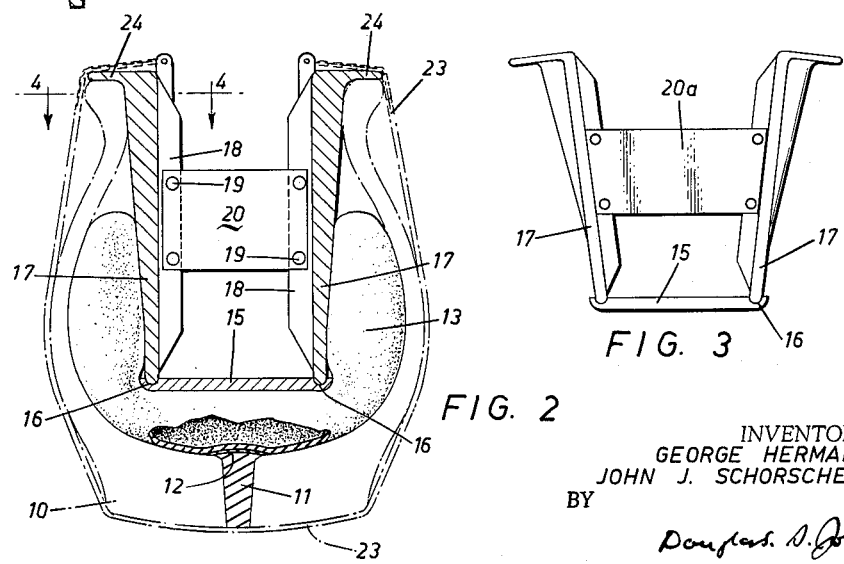
INVENTORS
GEORGE HERMAN
JOHN J. SCHORSCHER
Attorney 3,261,240
APPARATUS FOR TIRE REPAIR
George Herman, 273 Ellerslie Ave., Willowdale, Ontario,
Canada, and John J. Schorscher, R.R. 1, Downsview,
Ontario, Canada
Filed Aug. 17, 1964, Ser. No. 389,928
Claims priority, application Great Britain, Mar. 18, 1964,
11,466/64
4 Claims. (Cl. 81—15.2)

In applicants' co-pending U.S. application SN 306,810, now Patent 3,172,158, portable apparatus is described to effect repair to an aperture in the wall of a tire by heat curing a cone shaped plug inserted into the opening. However, after the plug has been cured and to effect the best repair possible, it is advisable to apply a patch over the plug, adhesion being provided by a suitable tire cement, after which sustained pressure is applied to the patch to effect maximum adhesion; it would be advantageous to provide apparatus also of a portable nature which could be easily inserted into the tire to provide the necessary pressure to the patch.

These together with other objects and advantages which will become subsequently apparent reside in the details of construction and operation as more fully hereinafter described and claimed, reference being had to the accompanying drawing forming a part hereof, in which:

FIG. 1 is an illustration in perspective of one embodiment of the invention partially in section;

FIG. 2 is a cross section taken on line 3—3;

FIGURE 3 is a front end view of an embodiment of the invention when used in a tire of larger cross section than that shown in FIG. 1;

FIG. 4 is a cross section taken on the line 4—4 of FIG. 2.

Referring now to the drawing, as shown in FIGURES 1 and 2 the tire 10 which has been previously repaired to the extent of insertion with a plug 11 in an opening in the tread portion has a patch 12 covering the plug. The adhesion of the patch 12 to the plug 11 is provided by one of the conventional cements applied thereto and it is allowed to dry before the patch 12 is placed on the plug 11. An inflatable bag 13 rests over the patch 12 and pressure means 14 are provided to inflate the bag 13 to the required pressure.

A base plate member 15 rests on the bag 13 and a pair of grooves 16 are provided on the upper surface of the base plate member 15. Each groove 16 is positioned adjacent a longitudinal edge of the base plate member 15 and provides a means for locating the lower end of one of a pair of opposed plate members 17 positioned in the tire. A pair of vertical ribs 18 are provided on the inner face of each of the plate members 17 and each of the ribs 18 has a pair of holes positioned so that pins 19 may be inserted to secure a bracing member 20 which will connect the plate members 17 to limit the rocking movement of the latter in the grooves 16.

The vertical plate members 17 are provided at their opposed inner faces with a further pair of ribs 21 disposed as shown in FIGURE 1; a pin 22 is located in the upper end of each rib 21 to provide means for securing a pair of chains 23 which encompass the tire 10. The length of the chains 23 is selected so that they will limit the upward movement of the plate members 17 on inflation of the bag 13. The plate members 17 are provided with a flange 24 which is somewhat wider than the bead of the tire 10 to prevent damage to the bead when the chains 23 are tightened.

The outward surface 25 of the plate members 17 at their upper ends is made in arcuate form as shown in FIGURE 4 so that the pressure exerted on the bead of the tire 10 by the outer face of each of the plate members 17 is applied at only one point and not at two points which would exert a cutting action.

FIGURE 3 shows the arrangement when the same plate members 17 and the base plate member 15 are used in a tire of larger width than that shown in FIGURE 1 and this is accomplished by means of a wider bracing member 20a which has tapered ends.

While certain embodiments have been illustrated and described for the purpose of disclosure, it will be understood that the invention is not limited thereto, but contemplates such modifications and other embodiments as may be utilised without departing from the invention.

We claim:

1. Apparatus for applying pressure to a patch adhering to an inner wall of a tire comprising an inflatable bag positioned in said tire and bearing against said patch, a pair of opposed plates, means swivably locating said plates in said tire with their lower ends transmitting pressure against said bag, a flange secured to the upper end of each plate and adapted to extend over the adjacent edge of the wall of said tire and means for limiting the upward movement of said plates on inflation of said bag with the outer surface of each plate being arcuately contoured adjacent said flange to provide substantially point contact with the adjacent edges of said tire wall.

2. Apparatus for applying pressure to a patch adhering to an inner wall of a tire comprising an inflatable bag positioned in said tire and bearing against said patch, a pair of opposed plates, means swivably locating said plates in said tire with their lower ends transmitting pressure against said bag, said swivable means comprising a third plate with its lower surface bearing against said bag, the upper surface of said plate being provided with a pair of spaced apart grooves each carrying the lower end of one of said plates, means adapted to limit the rocking movement of the lower end of said plates in said grooves, a flange secured to the upper end of each plate and adapted to extend over the adjacent edge of the wall of said tire and means for limiting the upward movement of said plates on inflation of said bag with the outer surface of each being arcuately contoured adjacent said flange to provide substantially point contact with the adjacent edges of said tire wall.

3. Apparatus according to claim 2 wherein the means for limiting the rocking movement comprises a cross member secured to the inner surfaces of said opposed plates.

4. Apparaus according to claim 2 wherein the means for limiting the rocking movement comprises a cross member secured to the inner surfaces of said opposed plates, the ends of said cross member being tapered towards each other.

References Cited by the Examiner

UNITED STATES PATENTS 503,636   8/1893   Williams _____ 81—15.2
2,442,499   6/1948   Kraft _____ 18—18

WILLIAM FELDMAN, *Primary Examiner.*

O. M. SIMPSON, *Assistant Examiner.*